United States Patent
Skelly et al.

(10) Patent No.: US 7,530,631 B2
(45) Date of Patent: May 12, 2009

(54) VEHICLE SEATING WITH STORAGE FEATURE

(75) Inventors: Trevor B. Skelly, Winston-Salem, NC (US); James Randy Penley, Pfafftown, NC (US); Alexander Filip Grauls, Couffouloeux (FR); Edgar Owen Kinnier, III, Winston-Salem, NC (US); Glenn A. Johnson, King, NC (US); Michael Princip, Winston-Salem, NC (US); Gary William McKelvey, Dallas, TX (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 11/941,693

(22) Filed: Nov. 16, 2007

(65) Prior Publication Data

US 2008/0061606 A1     Mar. 13, 2008

Related U.S. Application Data

(62) Division of application No. 11/008,684, filed on Dec. 9, 2004, now abandoned.

(60) Provisional application No. 60/589,297, filed on Jul. 20, 2004, provisional application No. 60/529,686, filed on Dec. 15, 2003.

(51) Int. Cl.
*A47C 7/62* (2006.01)

(52) U.S. Cl. .................. 297/188.08; 297/188.21

(58) Field of Classification Search .......... 297/188.08, 297/188.11, 188.13, 188.01, 188.21, 188.12; 312/235.2, 235.5, 321.5, 328; 244/122 R; 383/47; 224/275
See application file for complete search history.

(56) References Cited

U.S. PATENT DOCUMENTS

| | | | | |
|---|---|---|---|---|
| 1,302,397 A | * | 4/1919 | McEwan | 312/303 |
| 2,748,841 A | * | 6/1956 | Rimkus | 297/188.12 |
| 2,931,550 A | * | 4/1960 | Wood | 224/275 |
| 3,026,141 A | * | 3/1962 | Welles | 297/188.11 |
| 3,131,813 A | * | 5/1964 | Jensen | 224/275 |

(Continued)

FOREIGN PATENT DOCUMENTS

EP          0869061 A3    11/1999

(Continued)

*Primary Examiner*—Laurie K Cranmer
(74) *Attorney, Agent, or Firm*—Adams Intellectual Property Law, P.A.

(57) ABSTRACT

A passenger seat for a vehicle includes a seat bottom and a seat back mounted to a frame. The passenger seat includes at least one storage feature. One of the storage features may be a storage unit positioned underneath the seat bottom which is moveable between a first position in which the unit is readily accessible by a seated passenger, and a second position in which the unit is held upright or against a lower side of the seat bottom to reduce the intrusion of the unit into the under-seat space. Another storage feature may be a recess formed in the upper part of the seat bottom. The recess is covered by a moveable lid which forms part of the seating surface when closed.

9 Claims, 5 Drawing Sheets

U.S. PATENT DOCUMENTS

| | | | |
|---|---|---|---|
| 3,623,683 A * | 11/1971 | Bennett | 244/122 A |
| 3,833,257 A | 9/1974 | Dove | |
| 4,018,166 A | 4/1977 | Gutridge et al. | |
| 4,061,395 A * | 12/1977 | Boole | 297/188.11 |
| 4,756,034 A | 7/1988 | Stewart | |
| 4,799,632 A | 1/1989 | Baymak et al. | |
| 5,065,920 A * | 11/1991 | Amner | 224/275 |
| 5,096,249 A * | 3/1992 | Hines | 296/37.15 |
| 5,507,555 A | 4/1996 | Kiguchi | |
| 5,560,681 A | 10/1996 | Dixon et al. | |
| 5,641,197 A * | 6/1997 | Springmann | 297/188.11 |
| 5,857,745 A | 1/1999 | Matsumiya | |
| 5,887,942 A * | 3/1999 | Allegro, Jr. | 297/188.12 |
| 5,954,401 A | 9/1999 | Koch et al. | |
| 5,992,798 A | 11/1999 | Ferry | |
| 6,059,364 A | 5/2000 | Dryburgh et al. | |
| 6,074,000 A | 6/2000 | Wagner | |
| 6,119,980 A | 9/2000 | Ferry | |
| 6,276,635 B1 | 8/2001 | Ferry et al. | |
| 6,305,644 B1 | 10/2001 | Beroth | |
| 6,412,870 B1 | 7/2002 | Higgins et al. | |
| 6,494,536 B2 | 12/2002 | Plant | |
| 6,644,523 B1 | 11/2003 | Salas | |
| 6,692,069 B2 | 2/2004 | Beroth et al. | |
| 6,769,739 B2 | 8/2004 | Salzer et al. | |
| 7,008,013 B2 * | 3/2006 | Okamoto | 297/188.11 |
| 2003/0075962 A1 | 4/2003 | Saltzer et al. | |
| 2003/0085597 A1 | 5/2003 | Ludeke et al. | |

FOREIGN PATENT DOCUMENTS

| | | |
|---|---|---|
| EP | 1043225 A2 | 10/2000 |
| EP | 1044878 A2 | 10/2000 |
| EP | 1097864 A1 | 5/2001 |
| GB | 2295962 A | 6/1996 |
| GB | 2331237 A | 5/1999 |
| JP | 3-1837 | 1/1991 |
| WO | 01/32506 A1 | 5/2001 |

* cited by examiner

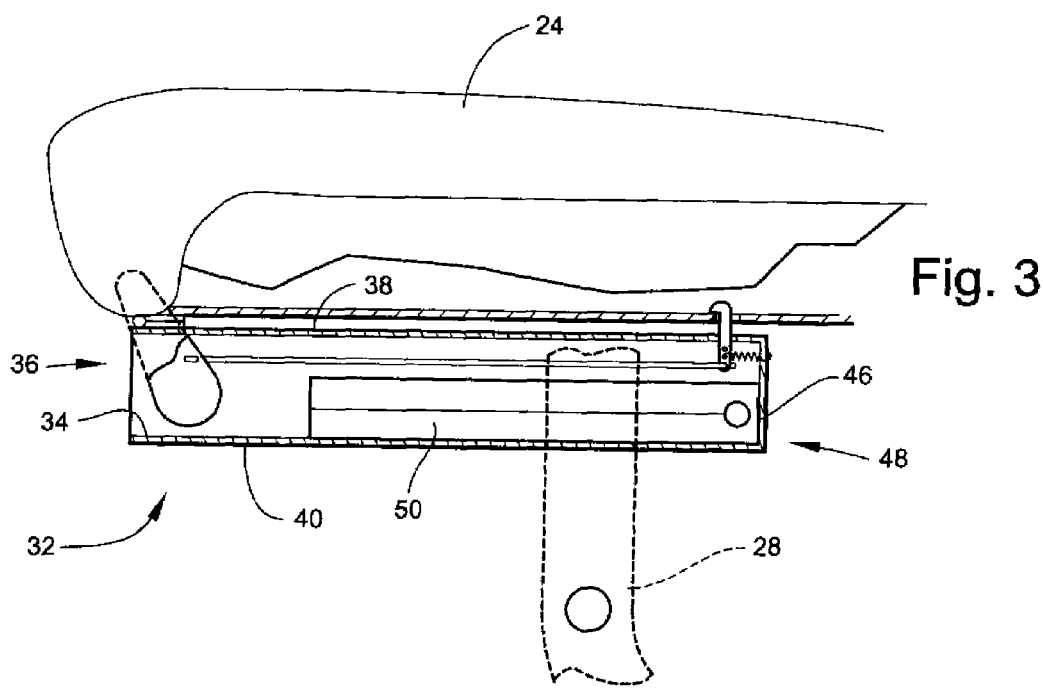
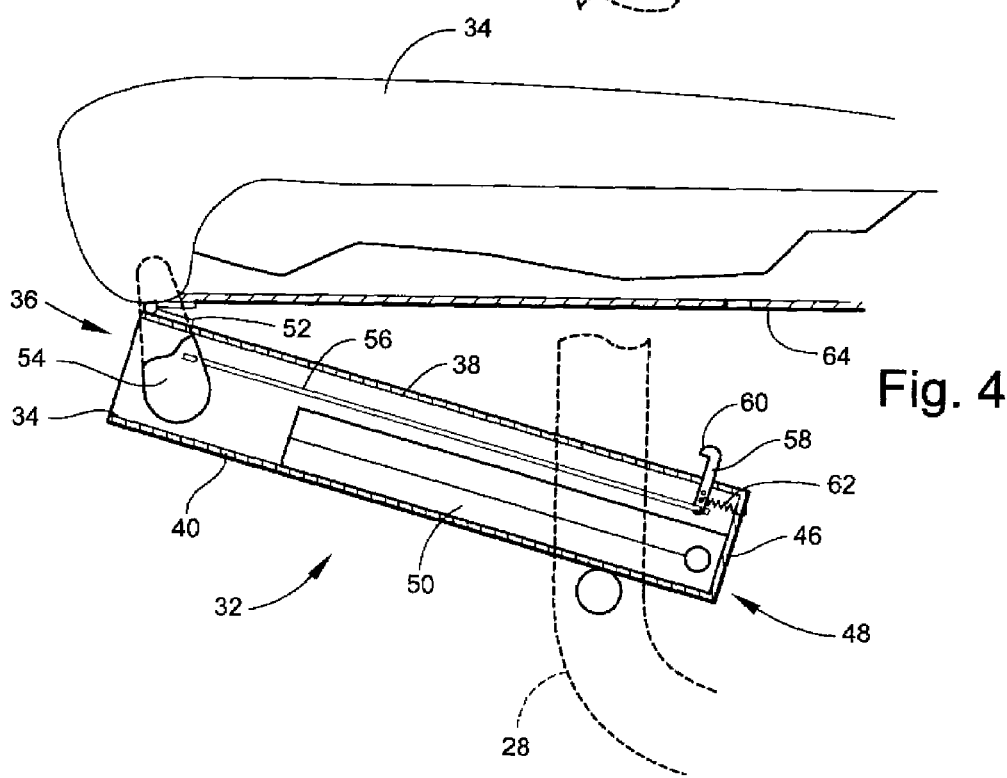

VEHICLE SEATING WITH STORAGE FEATURE

CROSS-REFERENCE TO RELATED APPLICATIONS

This is a divisional application of U.S. patent application Ser. No. 11/008,684 filed Dec. 9, 2004; which claims the benefit of U.S. Provisional Application No. 60/589,297 filed Jul. 20, 2004, and U.S. Provisional Application No. 60/529,686, filed Dec. 15, 2003.

BACKGROUND OF THE INVENTION

This invention relates generally to vehicle seating and more particularly to tourist or coach class aircraft seating. Aircraft seating is typically divided into various classes, for example first class, business class, and coach or tourist class. For each class of seating, an individual passenger is allotted a preselected amount of space (both area and volume). First-class seats provide the most individual space, and also may include features to improve comfort, such as fully reclining sleeper functions. In contrast, the tourist/coach class is provided with a relatively small amount of space, in order to provide the most efficient transportation and lowest cost.

Passengers also typically bring carry-on baggage or other personal items on to airline flights. These items must be stored in available spaces, such as underneath the seat in front of the passenger's seat. However, given the already limited space, storage of items in these areas decreases the room available for the passenger to achieve different seating positions.

BRIEF SUMMARY OF THE INVENTION

Therefore, it is an object of the present invention to provide a vehicle passenger seat which allows a passenger to store and retrieve various items underneath his or her seat.

It is another object the present invention to provide a seat bottom for a passenger seat having a built-in storage compartment.

These and other objects are met by the present invention, which in one embodiment provides a passenger seat including a frame for being attached to a floor of a vehicle; a seat bottom carried by the frame for supporting a passenger; an upwardly-extending seat back carried by the frame; and a storage unit disposed underneath the seat bottom, the storage unit having an access opening disposed at a front end thereof. The storage unit is mounted so as to be moveable between a first position in which the access opening is readily accessible by a passenger seated on the seat bottom, and a second position in which the container is held against a lower surface of the seat bottom so as to reduce the intrusion of the container into a space defined by the seat bottom and the frame.

According to another embodiment of the present invention, the storage unit is generally rectangular and includes opposed top and bottom walls, opposed side walls, and a rear wall disposed opposite the access opening.

According to another embodiment of the present invention, the front end of the storage unit is pivotally mounted to the seat bottom.

According to another embodiment of the present invention, the passenger seat further includes a releasable latch operable to selectively retain the storage unit in the first position.

According to another embodiment of the present invention, the passenger seat further includes wherein said releasable latch includes a release handle disposed so as to be reachable by a passenger seated on the seat bottom and operably connected to the latch so as to release the latch in response to movement of the handle.

According to another embodiment of the present invention, the passenger seat further includes means for selectively retaining the storage unit in the first position.

According to another embodiment of the present invention, a passenger seat for a vehicle includes a frame for being attached to a floor of a vehicle; an upwardly-extending seat back carried by the frame; a seat bottom disposed on the frame for supporting a passenger, the seat bottom having a recess formed therein which is accessible from an upper surface of the seat bottom; and a lid disposed over the recess. The lid is moveable between a closed position in which an upper surface of the lid forms a seating surface; and an open position in which the recess is accessible.

According to another embodiment of the present invention, a rear end of the lid is pivotally attached to the seat bottom.

According to another embodiment of the present invention, the recess extends downward into a front face of the seat bottom to improve access thereto.

According to another embodiment of the present invention, the lid includes a downwardly-extending front panel.

According to another embodiment of the present invention, the lid includes at least one finger slot formed therein.

According to another embodiment of the present invention, the upper surface of the lid has upholstery material or padding disposed thereon.

According to another embodiment of the present invention, a passenger seat includes a frame for being attached to a floor of a vehicle; a seat bottom carried by the frame for supporting a passenger; an upwardly-extending seat back carried by the frame; and a storage unit disposed underneath the seat bottom. The storage unit has an access opening disposed at an upper end thereof. The storage unit is moveable between a first position in which the access opening is readily accessible by a passenger seated on the seat bottom, and a second position in which the storage unit is held in an upright orientation underneath the seat bottom with the front wall substantially flush with a front edge of the seat bottom.

According to another embodiment of the present invention, the storage unit is generally rectangular and includes opposed front and rear walls, opposed side walls, and a bottom wall disposed opposite the access opening.

According to another embodiment of the present invention, the bottom end of the storage unit is pivotally mounted adjacent the floor.

According to another embodiment of the present invention, the passenger seat further includes means for selectively retaining the storage unit in the first position.

According to another embodiment of the present invention, the passenger seat includes a handle disposed so as to be reachable by a passenger seated on the seat bottom.

BRIEF DESCRIPTION OF THE DRAWINGS

The subject matter that is regarded as the invention may be best understood by reference to the following description taken in conjunction with the accompanying drawing figures in which:

FIG. 3 is a side cross-sectional view of the passenger seat incorporating a storage unit in a raised position;

FIG. 4 is a side cross-sectional view of the storage unit of FIG. 4 in a lowered position;

DETAILED DESCRIPTION OF THE INVENTION

Figure 1:
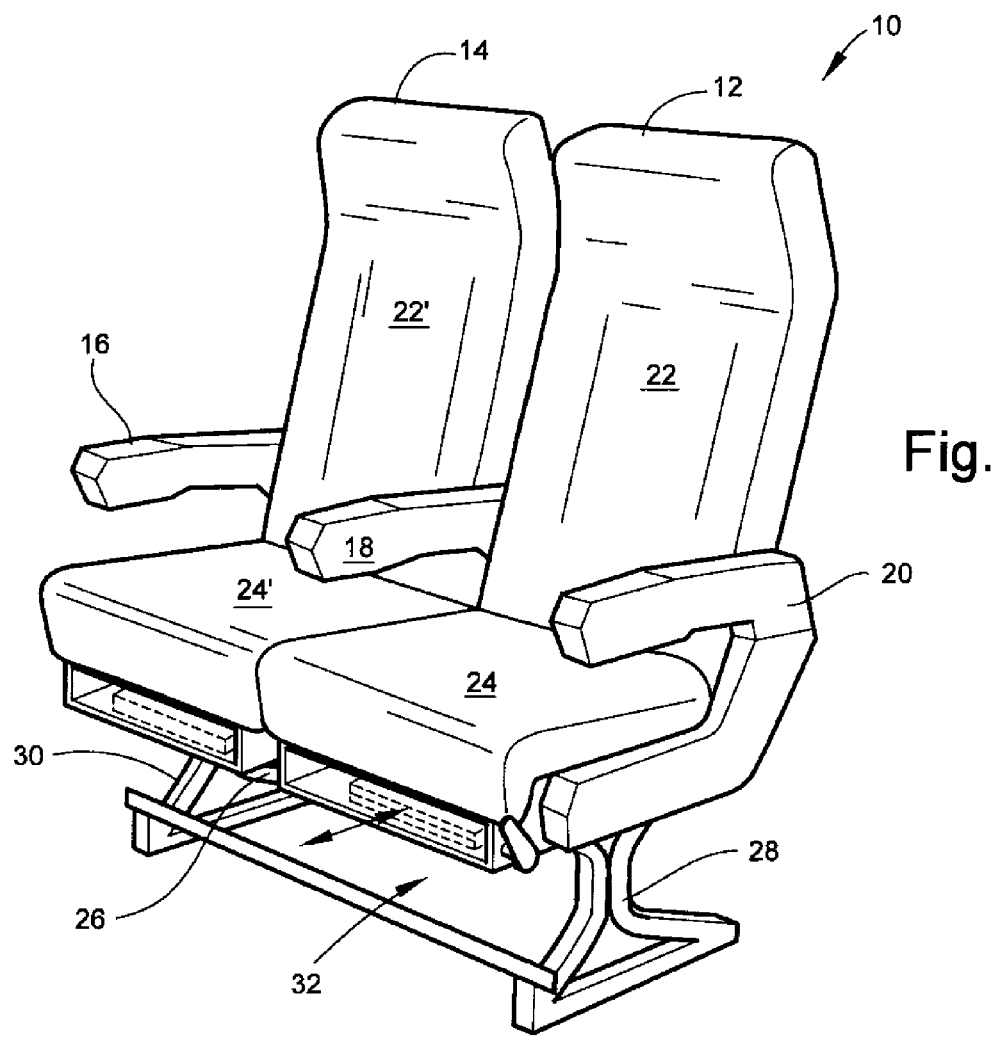
FIG. 1 is a perspective view of a passenger seat set having an under-seat storage unit.

Referring to the drawings wherein identical reference numerals denote the same elements throughout the various views, FIGS. 1-4 illustrate a passenger seat set 10 including an under-seat storage unit. The seat set 10 includes two seats 12 and 14 which are collectively provided with three arm rests 16, 18, and 20, each shown in the lowered passenger use position. The seats include seat backs 22 and 22' and seat bottoms 24 and 24'. The seats 12 and 14 are supported by a frame 26. The frame 26 is mounted on legs 28 and 30 that are in turn mounted to the deck of the aircraft by track fittings of a known type. For illustrative purposes, the under-seat storage unit feature is only shown in detail with respect to the seat 12, however it will be understood that another storage unit may also be implemented on the other seat 14.

Figure 2:
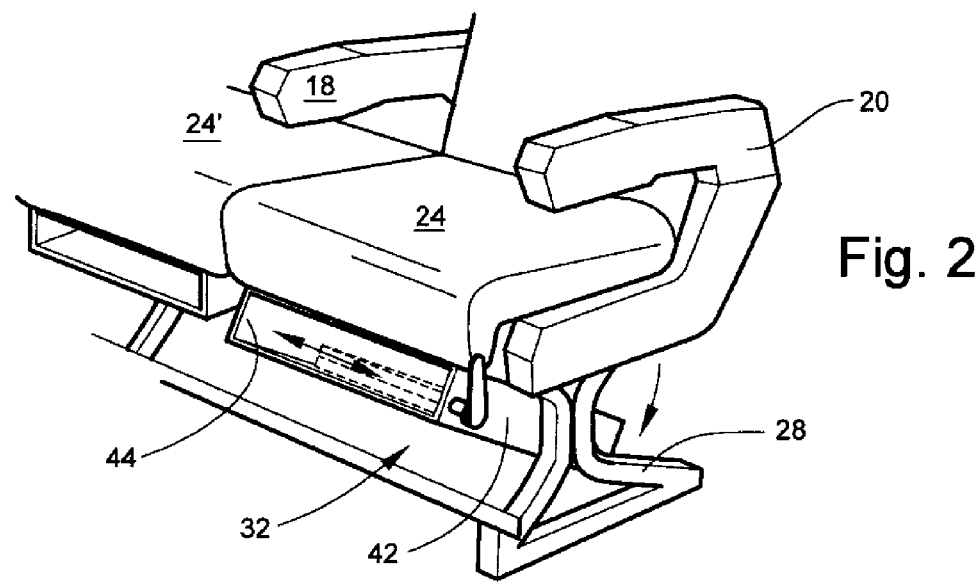
FIG. 2 is a perspective view of a portion of the passenger seat set of FIG. 1, showing a storage unit thereof in a lowered position.

The storage unit 32 comprises a container having an access opening 34 at its front end 36, opposed top and bottom walls 38 and 40, opposed side walls 42 and 44, and a rear wall 46 at its aft end 48. The storage unit 32 is mounted under the seat bottom 24 and is accessible by a seated passenger by reaching under the seat cushion for storage of small items, indicated generally at 50. In order to improve the accessibility of the storage unit 32 for loading and unloading, it may be tilted downward as shown in FIGS. 2 and 4. In the illustrated example, this motion is facilitated by mounting the storage unit 32 to the seat bottom 24 by a laterally-extending hinge 52 attached to the top wall 38 near the front end 36.

The illustrated storage unit 32 includes a latching mechanism comprising a pivotally mounted release handle 54, a connecting rod 56, a latch 58 including a hook 60, and a return spring 62. As shown in FIG. 3, the hook 62 engages a slot 64 in the seat bottom 24 to hold the storage unit 32 in a position parallel to the seat bottom 24, which minimizes the intrusion of the storage unit 32 into the space below the seat bottom 24. The latch 58 is held in this latched position by the return spring 62. The storage unit 32 may be pivoted downward to improve access for loading and unloading as shown in FIG. 4 by pivoting the release handle 54 forward, in turn causing the connecting rod 56 to pull the latch 58 to a released position, disengaging the hook 60 from the slot 64. It will be understood that the method of mounting the storage unit 32 as well as securing it may be varied to suit a particular application, so long as the unit can be selectively held in a position in which it is disposed out of the way of the space underneath the seat bottom 24, to minimize its intrusion into that space and leave room for a passenger's feet or storage of other objects.

Figure 5:
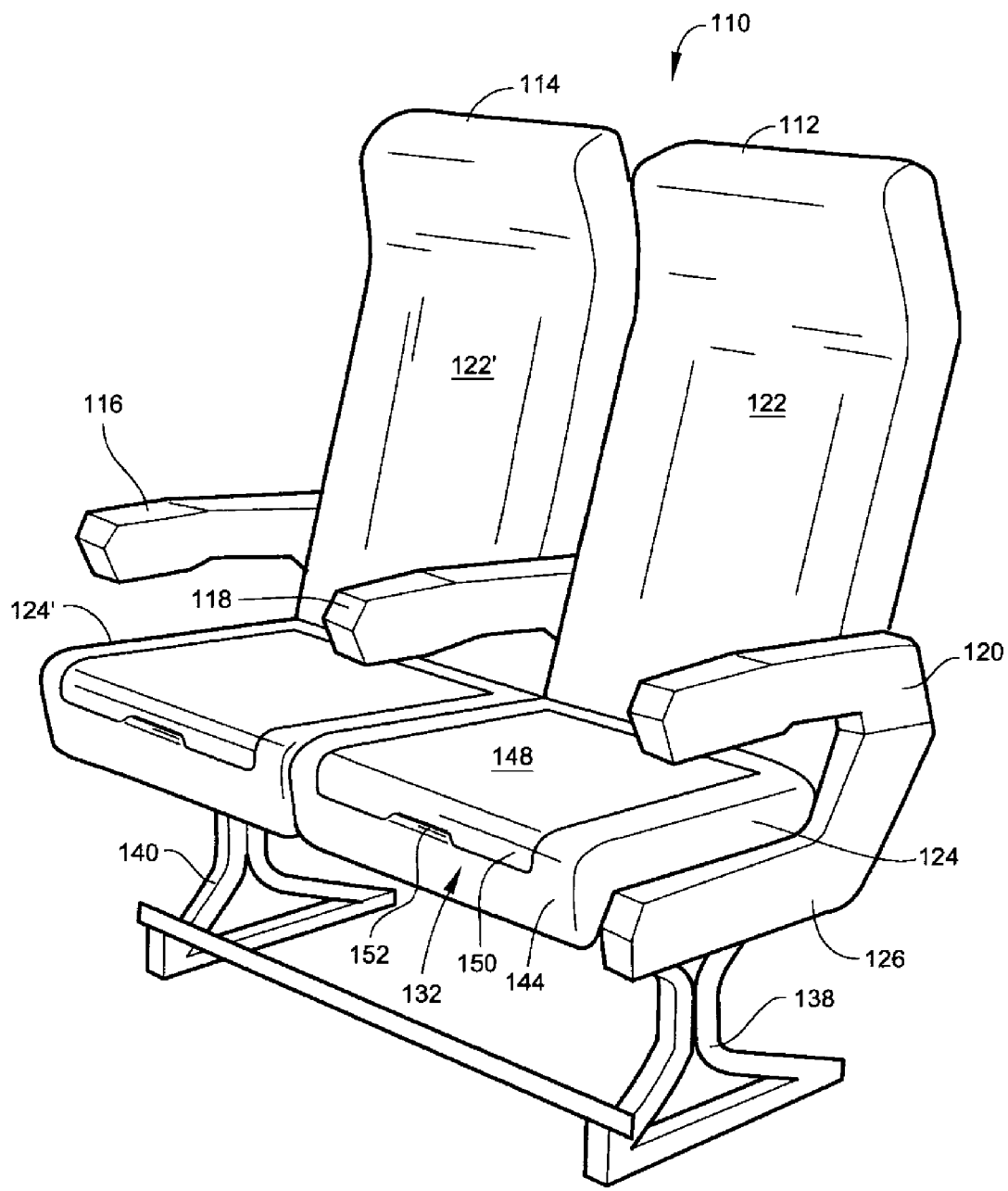
FIG. 5 is a perspective view of a passenger seat set having an in-seat storage compartment.
Figure 6:
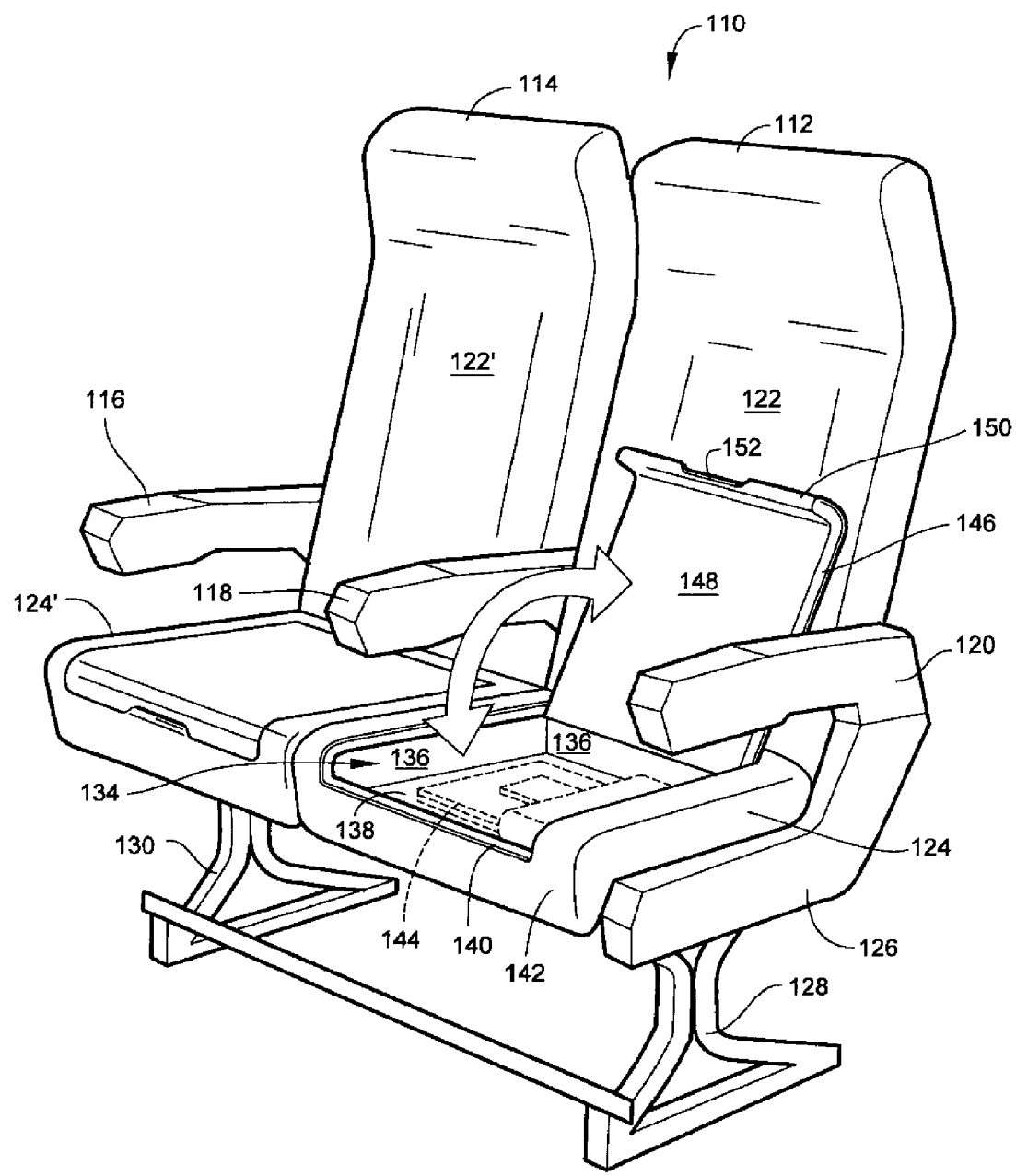
FIG. 6 is a perspective view of the passenger seat set of FIG. 5 showing a storage compartment lid in an open position.

FIGS. 5 and 6 illustrate a passenger seat set 110 including an in-seat storage compartment. The seat set 110 includes two seats 112 and 114 which are collectively provided with three arm rests 116, 118, and 120, each shown in the lowered passenger use position. The seats include seat backs 122 and 122' and seat bottoms 124 and 124'. The seats 112 and 114 are supported by a frame 126. The frame 126 is mounted on legs 128 and 130 which are in turn mounted to the deck of the aircraft by track fittings of a known type.

The storage compartment, denoted 132, comprises a recess 134 built into the upper surface of the seat bottom 124. The recess 134 is defined by one more side panels 136 and a bottom panel 138. The front edge 140 of the recess 134 may extend downward into the front face 142 of the seat bottom 124 to improve access. The storage compartment 132 may be used for storage of small items, indicated generally at 144. A lid 146 is provided which is hinged to the seat bottom 124, in this case near the back of the seat bottom 124. The lid 146 covers and encloses the recess 134 in the closed position as shown in FIG. 15 and provides access to the recess 134 when it is pivoted upward to the open position as shown in FIG. 16. The lid 146 comprises a top panel 148 which conforms to the profile of the seat bottom 124. The upper surface of the top panel 148 may be covered in padding and/or upholstery as desired. An optional front panel 150 is connected to the top panel 148 and serves to cover the front face 142 of the seat bottom 124. The top panel 148 may include means for opening the lid 146, such as the finger slot 152 illustrated. Other means for opening the lid 146, such as a handle attached thereto (not shown), may also be provided. If desired means of a known type (not shown) may be provided for latching and/or locking the lid 146 in the open or closed positions.

Figure 7:
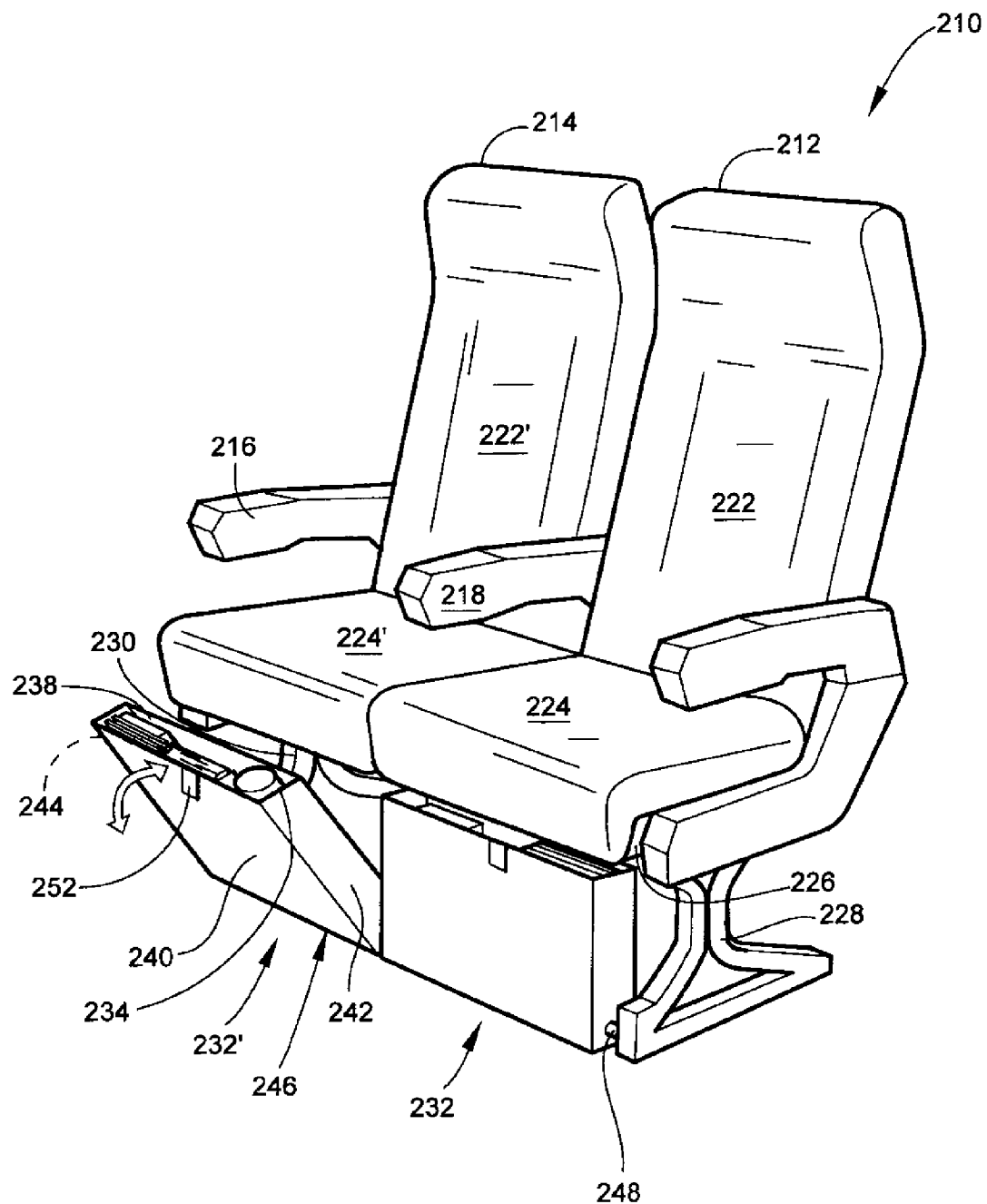
FIG. 7 is a perspective view of a passenger seat set including an alternative under-seat storage unit.

FIG. 7 illustrates a passenger seat set 210 including an alternative under-seat storage unit. The seat set 210 is identical to the seat set 10 and includes two seats 212 and 214 which are collectively provided with three arm rests 216, 218, and 220. The seats 212 and 214 include seat backs 222 and 222' and seat bottoms 224 and 224'. The seats 212 and 214 are supported by a frame 226 which is mounted on legs 228 and 230 that are in turn mounted to the deck of the aircraft by track fittings of a known type. Storage units 232 and 232' are mounted underneath seats 212 and 214, respectively. The storage units 232 and 232' are substantially identical in construction.

Each storage unit 232 and 232' comprises a container having an access opening 234 at its upper end, opposed back and front walls 238 and 240, opposed side walls 242 and 244, and a bottom wall 246. The storage units 232 and 232' are pivotally mounted to the seat set 210, for example using a shaft 248, a portion of which is visible in FIG. 7. The storage units 232 and 232' are disposed in a generally upright position under the seat bottom 224, aligned with the front edge thereof so that the front wall 240 is substantially flush with the front edge of the seat bottoms 224 and 224', respectively. In this position, small items contained in the storage units 232 and 232', indicated generally at 250, are prevented from falling out. In this upright position, the storage unit 232 itself does not interfere with the leg room of a passenger seated in seat 212, and only minimally impacts the storage and foot area underneath the seat bottom 224.

The storage unit is loaded or unloaded by first tilting it forward about the shaft 248. A small tab or handle 252 may be provided for this purpose. In FIG. 7, storage unit 232' is shown tilted forward. In this position, the access opening 234 is accessible by the passenger. Means (not shown) may be provided both for keeping the storage unit 232 in an upright position when not being loaded or unloaded, and for preventing it from pivoting too far forward when opened.

The foregoing has described a seating arrangement having one or more storage features. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A passenger seat comprising:
   a frame adapted for being attached to a floor of a vehicle;
   a seat carried by said frame for supporting a passenger, said seat including a seat bottom and a seat back extending upwardly from said seat bottom;
   a storage unit disposed underneath said seat bottom, said storage unit having an access opening disposed at a front end thereof and being mounted so as to be moveable between:
   a first position in which said access opening is readily accessible by a passenger seated on said seat bottom, and
   a second position in which said storage unit is retained against a lower surface of said seat bottom so as to reduce the intrusion of said storage unit into a space defined by said seat bottom and said frame; and
   a latching mechanism for selectively retaining said storage unit in said second position, said latching mechanism comprising a pivotally mounted release handle, a connecting rod and a latch including a hook, the hook engaging a slot formed in said seat bottom to retain said storage unit in said second position generally parallel to said seat bottom, said latching mechanism operable to pivot said storage unit downward relative to said seat bottom to said first position by pivoting the release handle to cause the connecting rod to pull the latch to a released position wherein the hook is disengaged from the slot of said seat bottom.

2. The passenger seat of claim 1 wherein said storage unit is generally rectangular and includes opposed top and bottom walls, opposed side walls, and a rear wall disposed opposite said access opening.

3. The passenger seat of claim 2 wherein said storage unit is pivotally mounted to said seat bottom by a laterally-extending hinge attached to the top wall of said storage unit adjacent the front end.

4. A storage unit for a passenger seat including a generally planar, longitudinally-extending seat bottom, the storage unit comprising:
   a container having opposed top and bottom walls, opposed side walls and a rear wall, said container defining an access opening opposite the rear wall and adjacent a front end of said storage unit; and
   a latching mechanism for selectively retaining said container generally parallel to said seat bottom, said latching mechanism comprising a pivotally mounted release handle disposed adjacent the front end of said storage unit, a latch disposed adjacent the rear wall of said container, and a connecting rod extending between the release handle and the latch, said latching mechanism operable to release said storage unit and to pivot said container downward relative to said seat bottom about the release handle such that the access opening is readily accessible by a passenger seated on said seat bottom.

5. The storage unit of claim 4 wherein the latch includes a hook for engaging a slot formed in said seat bottom to retain said container generally parallel to said seat bottom.

6. The storage unit of claim 4 wherein said latching mechanism further comprises a return spring for holding the latch in a latched position with said container selectively retained generally parallel to said seat bottom.

7. A storage unit for a passenger seat having a seat bottom, the storage unit comprising:
   a top wall, a bottom wall, a pair of opposed side walls and a rear wall defining a generally hollow container having an access opening opposite the rear wall and adjacent a front end of the storage unit, and
   a hinge attached to the seat bottom and the top wall and extending laterally between the opposed side walls adjacent the front end of the storage unit, the hinge permitting the container to pivot downward relative to the seat bottom about the hinge adjacent the front end of the storage unit.

8. The storage unit of claim 7 further comprising a latching mechanism for selectively retaining the top wall of the container generally parallel to a lower surface of the seat bottom, the latching mechanism comprising a release handle, a latch and a connecting rod extending therebetween and wherein the release handle is operable to cause the connecting rod to pull the latch to a released position.

9. The storage unit of claim 8 wherein the latch of the latching mechanism includes a hook that engages a slot formed in the seat bottom to retain the top wall generally parallel to the lower surface of the seat bottom and wherein the release handle is operable to disengage the hook from the slot of the seat bottom to permit the container to pivot about the hinge.

* * * * *